Oct. 26, 1943.  E. ORSHANSKY, JR., ET AL  2,332,664
MOTOR
Filed Jan. 15, 1941  2 Sheets-Sheet 1

INVENTORS
Elias Orshansky, Jr.
Ernest W. Fuller
BY Duell, Kane and Smoot
ATTORNEYS Oct. 26, 1943.   E. ORSHANSKY, JR., ET AL   2,332,664
MOTOR
Filed Jan. 15, 1941   2 Sheets-Sheet 2
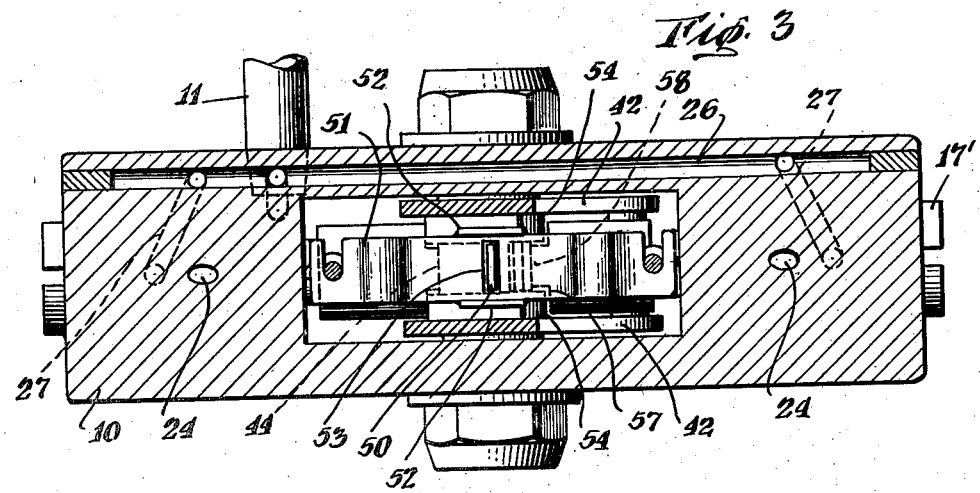
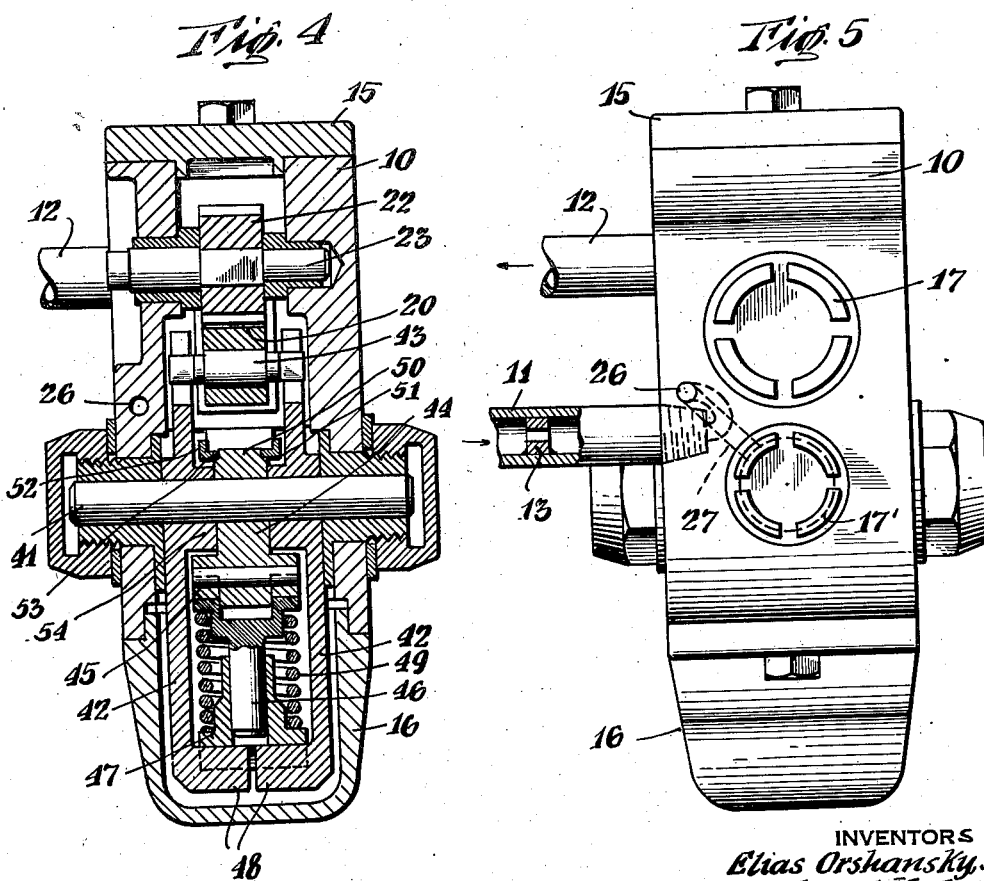
INVENTORS
Elias Orshansky, Jr.
Ernest W. Fuller
BY
ATTORNEYS Patented Oct. 26, 1943

2,332,664

UNITED STATES PATENT OFFICE 2,332,664

MOTOR

Elias Orshansky, Jr., University Heights, and Ernest W. Fuller, Shaker Heights, Ohio, assignors to The Aerotorque Company, Cuyahoga County, Ohio, a corporation of Ohio Application January 15, 1941, Serial No. 374,454

9 Claims. (Cl. 121—164)

This invention relates to a structurally and functionally improved windshield wiper mechanism and especially a motor to be employed to drive a wiper blade or similar structure; it being an object of the invention to provide a mechanism which in certain respects will constitute an improvement over that described and disclosed in the earlier United States patents in the name of Elias Orshansky, Jr., Nos. 2,265,306 and 2,265,-307, issued on December 9, 1941.

It is an object of the present invention to provide a mechanism by means of which an operator may efficiently control the operation of a windshield wiper or blade and despite the fact that the latter may be operating under most adverse conditions, i. e., be associated with the windshield of, for example, an aeroplane, and consequently subjected to the intense airflow which occurs in such an installation.

A further object of the invention is that of providing a unit of this character and the parts of which will remain properly correlated under virtually all conditions, so that an operator may be assured that the mechanism will function when he desires to initiate such a functioning.

A further object is that of devising a motor primarily intended for use in combination with a windshield mechanism, and which motor will operate under properly regulated conditions of speed, despite the fact that an operator may not be carefully and properly supervising the functioning of the mechanism.

Another object of the invention is that of designing a mechanism of this type and the parts of which in their operation will be properly cushioned so that no damage will occur to these parts and despite the fact that they operate over long periods of time and under varying conditions of load.

Among other objects of the invention are those of furnishing a mechanism which will include relatively few parts each individually simple and rugged in construction and which parts may be readily assembled to furnish a unitary apparatus operating over long periods of time with freedom from all difficulties; and in which apparatus when replacement or adjustment of the parts is necessary, this may readily be affected.

With these and other objects in mind, reference is had to the attached sheets of drawings illustrating one practical embodiment of the invention and in which:

Fig. 3 is a sectional top plan view taken along the lines 3—3 and in the direction of the arrows as also indicated in Fig. 1;

Fig. 4 is a transverse sectional view taken along the lines 4—4 and in the direction of the arrows as also shown in Fig. 1; and Fig. 5 is an edge view of the motor mechanism and with certain of the parts broken away to disclose the interior construction.

As afore brought out, the present invention aims to provide a mechanism which in certain aspects may be regarded as an improvement over that disclosed in the prior Orshansky patents. However, and as will be apparent, certain of the improvements which will be hereinafter referred to would be of utility when employed in conjunction with, or embodied in motor mechanisms of different types from that disclosed in these prior patents. Thus, except where otherwise indicated in the claims, the present illustration and following description are to be taken in an illustrative rather than a limiting sense.

Figure 1:
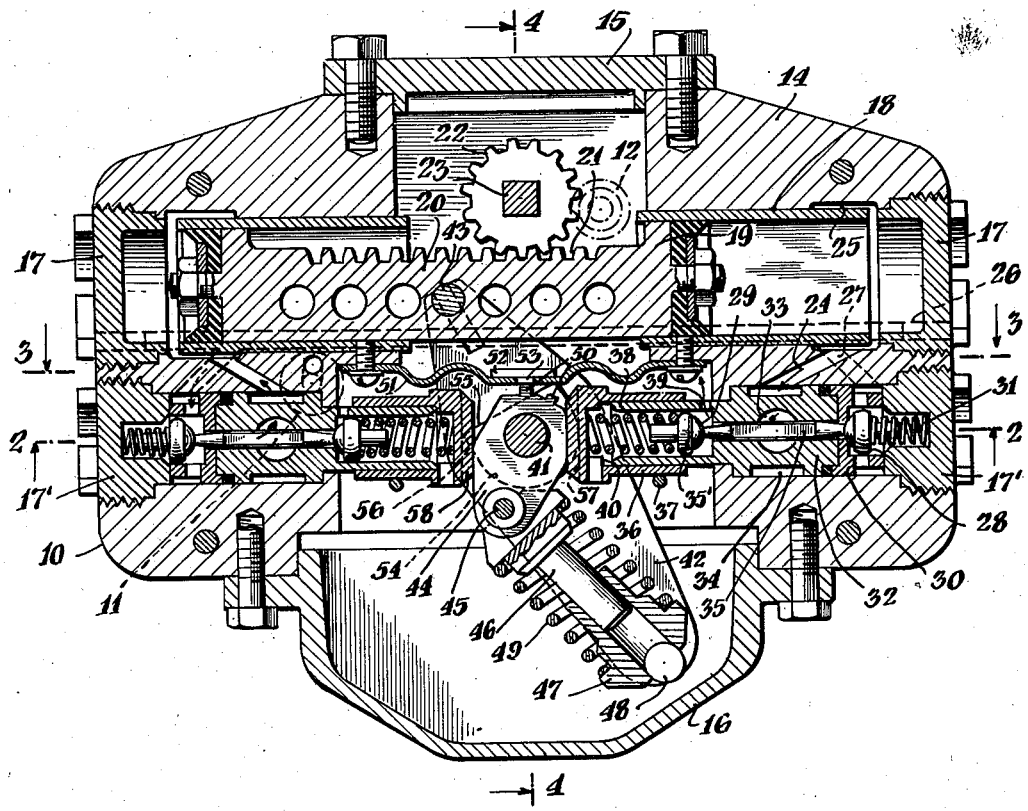
Fig. 1 is a sectional front view of a unit and showing the present improved construction embodied therein.

With the foregoing in mind, attention is invited primarily to Figs. 1 and 5 in which the reference numeral 10 indicates a casing preferably formed of metal and which is of a size such that it may readily be accommodated within the space commonly available to receive the same. Extending towards the casing and connected thereto is a tube 11, while a similar tube 12 may be connected to the outlet opening of such casing. The supply tube 11 is coupled to a source of fluid under pressure as for example oil—which may be under relatively high pressures running, if desired, up to 700 lbs. per sq. in. A valve (not shown) is interposed in tube or pipe 11 in advance of the casing and may be under the control of the operator so that the flow of fluid through tube 11 may be interrupted or permitted as desired.

Interposed within tube 11 is a fluid metering structure. As is obvious, this structure might take one of numerous different forms and instead of being interposed in the tube 11 might otherwise be suitably disposed so long as it is arranged in advance of the mechanism enclosed within housing 10. As illustrated, this metering structure takes the form of a plug 13 providing a bore of reduced and predetermined area through which the fluid must flow before reaching the operating mechanism of the motor.

Now assuming that the operator desires to cause a functioning of the wiper mechanism, and further assuming that the mechanism is to function against an ordinary load such as would be encountered under ordinary rain conditions, he will open the manual valve (which has not been shown in the drawings) to an extent such that the wiper blade of the mechanism will oscillate, for example, 300 times per minute. This will be more than adequate to maintain the windshield in clean condition. Under such circumstances and with, for example, 800 pounds pressure in advance of the manually operable valve, the pressure within tube 11, or its equivalent, and through to the operating mechanism of the motor, may be 300 pounds. Now assuming that a different condition confronts the operator, we may visualize snow or sleet conditions, such that the windshield tends to have ice built up on its exterior surface. Under these circumstances, the initial static load may be such that the operator will open and continue to open the manually controllable valve and only a sluggish initial response will occur on a part of the motor mechanism. If the load on that mechanism is to be sufficiently great, the pressure will, of course, build up through tube 11 and beyond metering plug 13 to a point where the pressure through to the mechanism will actually be as great as the pressure at a point short of the valve. Assuming that the motor mechanism now begins to operate at proper speed, the pressure at a point beyond the manually controllable valve will drop and this drop may be down to, for example, 400 pounds to the square inch. This may again result in 300 strokes per minute on the part of the motor mechanism.

If the snow and sleet condition should now change to rain or mist and the load should drop to a corresponding extent on the motor and its associated mechanism, the pressure within line 11 and to both sides of the plug 13 may drop to around 300 pounds and the motor mechanism will be performing 400 strokes per minute. However, under no circumstances will the mechanism operate at such a high speed that it will tend to become damaged.

In other words due to the provision of the metering plug or a similar restriction in the supply line, a safety structure is furnished such, that the operating fluid may never flow with sufficient velocity to the motor mechanism as to cause a functioning of the latter at a damaging speed. This will be despite the fact that the pilot or operator may operate the manually controlled valve in an improper and careless fashion or else due to the fact that the load on the motor mechanism is lightened. The worst which will under these circumstances occur is, that the motor will function at a speed slightly in excess of that necessary or desirable to achieve the results desired. At the same time, the metering restriction will not prevent an adequate flow of fluid towards the motor mechanism in the event of a heavy load being imposed on the latter, and so as to cause the mechanism to still function at a sufficiently high speed to achieve the desired results.

Now referring to the motor mechanism as especially shown in Figs. 1 and 4, it will be observed that the casing 10 may actually comprise a body 14 formed of relatively strong material such as metal, and which body may be furnished with bores and passages as will be hereinafter apparent. As also shown, access to the interior of the body may be had through movable covers 15 and 16, as well as pairs of plugs 17 and 17'. Cover 16 may actually provide a sump portion and the pairs of plugs 17 and 17' may close the ends of bores which extend longitudinally of the body 14.

The uppermost of these bores may accommodate cylinder liners 18 adjacent opposite ends and enclosed within the liners are the ends 19 of a double ended piston having a body portion 20 which connects the associated heads or ends. This body portion has been identified by the reference numeral 20, and conveniently presents a series of teeth 21 providing a rack and which mesh with the teeth of a pinion 22 affixed to shaft 23. The latter may extend through and beyond the side wall of the body 10 and be coupled to any mechanism such as it is desired to operate. This mechanism has not been shown but may take one of numerous different forms well known to those skilled in the art. In any event, in the instance of a windshield wiper installation, the ultimate object is ordinarily that of oscillating or reciprocating a blade across a surface to be cleaned and it is for this purpose that the present motor mechanism will be ordinarily employed.

Extending from each of the cylinders provided by the plugs 17 and the liners 18 are passages 24 which may have their inner ends communicating with enlarged portions 25 of the cylinders, their opposite ends communicating with chambers within which are disposed valves and operating mechanisms therefor. As shown especially in Fig. 3, the inlet tube 11 is connected to a manifold passage 26 extending lengthwise of body 14. This passage is connected by passages 27 with the valve chambers just referred to. It follows, that fluid may enter through tube 11, flow through passage 26 to passages 27 and thence through the valve mechanisms which will be hereinafter described and so, to either of the cylinders to cause reciprocation of the pistons 19 and the rack 21. Thereafter, the fluid will be discharged from the cylinders and again returned through the passages 24 and so, from the valve mechanism to what might be termed the sump portion of the motor, from which it will finally flow outwardly of the motor assembly through tube 12.

With reference to the valve mechanisms, it will be seen that two of these assemblies are employed. In view of the fact that they duplicate each other, insofar as structure is concerned, only one of them need be described and similar reference numerals may be employed.

Thus, each valve assembly may include a pair of valves 28 and 29; the outer valve 28 having movement in a guide 30 and being engaged by a spring 31 to normally move towards seated relationship with respect to a seat forming a part of that guide. Beyond the guide or member 30, a body 32 is disposed which has a bore in line with the opening in guide 30, and which is also formed with a transverse bore 33 as well as a groove or channel 34 on its outer face, or periphery. The inner end of body 32 terminates adjacent to the corresponding end of the bore, in a seat portion for valve 29. Disposed within this bore is a pin 35, the length of which should be slightly in excess of the distance between valves 28 and 29, with both of them in seated position. Accordingly, this pin will function as an actuator to maintain one of the valves in unseated condition when the other valve is seated. Body 32 is extended as indicated at 35' to provide a housing for valve 29. Upon the exterior face of this extension a tappet 36 is slidably mounted and this tappet may bear against a pin 37 in order to prevent rotation of the former with respect to the extension 35'. A spring 38 is housed within tappet 36 and bears against the outer face of valve body 29. The pin 35 is different in section than the bore within which it is disposed. Accordingly, fluid may flow through this bore and pass the side faces of pin 35. The side wall of extension 35' is formed with an opening 39, the area of which is less than the area of the effective passage between the pin and bore of body 32 and in the direction of valve 29; the purpose of this construction being hereinafter brought out. As also shown, body 30 is formed with openings such that fluid may flow from passage 27 into the bore end controlled by valve 28. Finally, with respect to this structure it will be noted that passage 24 has its inner end in line with channel 34.

It follows that if tappet 36 is retracted, spring 38 will become compressed to such an extent that valve 29 will seat against the inner end of the bore formed in body 32. Under these circumstances, fluid-flow will be prevented through this portion of the bore. As a consequence of pin 35, valve 28 will be unseated. Accordingly, fluid may flow from tube 11 through manifold 26, passage 27 and through the openings of member 30, past valve 28 and along stem 35 to bore 33. Thence, it will flow into channel 34 and through passage 24 into the enlarged portion 25 of the cylinder and thus it will act against the adjacent piston portion 19 to cause movement of the latter.

At this time it is especially to be noted that the inner face of the tappet 36 is formed with a shoulder 40 which seats against the adjacent edge of extension 35' to thus provide in conjunction with such edge, a stop limiting the inward movement of the tappets. Due to this construction, it is apparent that an over-compression of the spring 38 will, at all times, be prevented and a hammering of adjacent convolutions of the latter against each other will be precluded. Now if inward pressure on the tappet 36 is released, the spring 31 which has heretofore been compressed will urge the valve 28 into seated position, and thus prevent further flow of fluid through the adjacent passage 27. With the valve 28 seated, pin 35 will act to unseat valve 29. Accordingly, fluid may flow through passage 27, channel 34, bore 33, and so past the face of pin 35, through the bore of body 32 and past the valve with which seat 29 cooperates. Thereafter, it may escape through opening 39. For purposes hereinafter brought out and due to the restricted size of this orifice, such escape will be relatively sluggish or in other words impeded.

Now with a view to providing a mechanism which will assure a proper operation of the tappets and associated valve assemblies, it will be noted that the motor includes a transversely extending shaft 41, upon which are mounted a pair of arms 42. The upper end of these arms may be coupled—as for example by a pin and slot connection 43, to the piston assembly so that as the latter reciprocates the arms will be oscillated. Also mounted upon the shaft 41 is a cam element 44 and the latter is pivotedly connected as at 45 to a stem member 46 which has telescopic connection with a socket element 47 rockingly mounted by a pin 48 carried between the arms 42. A spring 49 is interposed between the head of the stem member 46 and the head of the socket member 47.

Consequently, the cam 44 forms part of a toggle assembly and as the arms 42 rock back and forth the axes of the stem and socket members will move to positions at which they are beyond the centers of the pivot 45 and shaft 41. When this occurs the cam 44 will tend to rapidly shift from one to the other extreme position. As a consequence of such shifting, one of the tappets 36 will be retracted and the other of the same will be projected. As shown, this will occur in a manner such that fluid may be exhausted from the cylinder, the piston of which has just completed a full working stroke and the other valve assembly will now permit introduction of fluid into the opposite cylinder.

If a structure and action as afore outlined is resorted to it will be found that ordinarily the mechanism functions with perfect satisfaction. However, in certain instances it has been found that difficulties of operation occur. More especially, if the operator interrupts a functioning of the motor prior to the toggle mechanism effecting a reverse of the cam 44, the shaft 23 may cause the parts of the motor to be driven in a direction reverse from that in which they have heretofore been moving. This may occur, for example, incident to the pressure exerted by the slip stream against the wiper arm or arms and associated blades, which latter assemblies are connected to shaft 23.

Now with a view to preventing any shifting or release of the valve mechanisms from the positions which they have been caused to assume, it is contemplated, according to the present invention, to employ a lock mechanism. This mechanism may take one of numerous different forms but in the interest of simplicity, it is preferred that it follow substantially the assemblage herein shown and described. Thus, as shown, especially in Fig. 1 the cam 44 may have a pair of projections 50 in its upper edge portion and a spring 51 may be mounted above this cam. As illustrated in Fig. 3, the central portion of the spring may have rigidifying side flanges 52 and be formed with a central opening 53, for the reception of either one of the projections 50. Each of the arms 42 is formed with a hub portion 54. The upper surfaces of these hub portions are milled or otherwise flattened, as indicated at 55, to thus provide adjacent to the upper corners of the hub projections which function as cams. These will act against the lower surface of the spring 51 to raise the latter as the arms 42 reach their extreme positions of movement. Accordingly, in such positions, the lock structure provided by one of the protuberances 50 in connection with the opening 53 will be released and accordingly, the cam 44 may be shifted. With such shifting the valve assemblies will be correspondingly shifted, to cause a reversal of movement on the part of the piston assembly. With such latter reversal of movement, arms 42 will begin to swing in the opposite direction. As soon as such motion is initiated, the cam portions of the arms 42 will move to positions at which the spring 51 may again have one of the protuberances 50 extending through its opening 53. Consequently, the cam 44 will now again be locked against movement.

Such locked position of the parts will be maintained until the arms 42 again reach their opposite limit of movement, at which time the spring will again be shifted to cam-releasing position and so that the latter may shift. Subsequently, and with the arms beginning a reverse movement, the opening 53 will engage the second protuberance of the cam to again maintain a locked position of the parts. As a consequence of this structure, it will be obvious that even if the operator should interrupt the functioning of the motor just prior to time at which the toggle is reversed—with consequent reversal of the cam—it will be impossible for the mechanism to be thrown out of proper timing. This will be because the cam is locked and consequently, the intake and exhaust valves of both valve assemblies cannot be simultaneously opened thus preventing a subsequent building up of pressure within the mechanism, and a refusal of the latter to function.

Now to assure a quick response on the part of the valve mechanism, it is proposed to reduce to a minimum the load on the cam. This may be accomplished by, for example, milling the side faces of the hub portion 54 to provide additional flattened surfaces 56. In line with these hub portions the tappets have their outer faces reduced as has been indicated especially at 57. Consequently, the surfaces 56 will engage these reduced or side portions 57 and as the arms reach a point adjacent, their extremes of travel, the hub portions 54 will function as cams to lift the tappets off of the face of cam 44. In other words, these hub portions will have the effect of not alone initiating a closing of that particular valve 29 which is then exhausting, but will also relieve the cam 44 from having to overcome frictional contact with the tappet 36.

Figure 2:
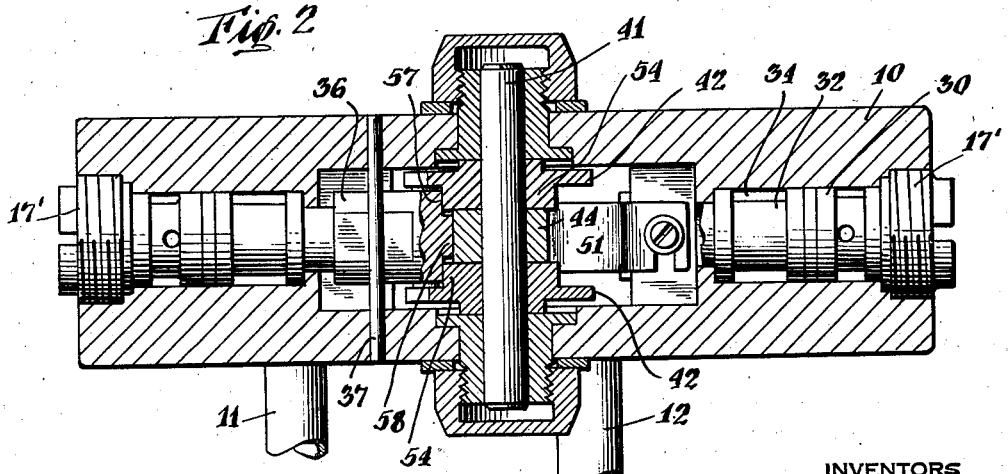
Fig. 2 is a sectional bottom plan view taken along the lines 2—2 and in the direction of the arrows as indicated in Fig. 1.

Thus, it follows that when the toggle has shifted to a position such that the parts are past dead center, the lock structure afore described will release and the cam will be potentialized to shift rapidly to its opposite extreme position and to correspondingly shift the valve assemblies. Obviously, as soon as arms 42 begin their reverse movements, the tappet which has heretofore been engaged by the milled surfaces 56 of the hubs 54 will be maintained in its inward position by the adjacent face of cam 44. More especially and as shown particularly in Fig. 2, the tappets each include what might be termed a central rail portion 58 as a consequence of the reduced side portions 57 and it is this rail portion with which the edges of cam 44 cooperate.

With a set-up of mechanism, such as afore described it will be obvious, assuming that tube 11 is supplied with a manually controllable valve and that it is connected to a source of fluid under pressure, and also assuming that shaft 23 is coupled to a mechanism which is to be operated, that with an opening of the manual valve, the mechanism will begin to function. More especially, fluid will flow through tube 11 and the orifice of the metering plug 13 and so into the manifold 26 from which it will be distributed through passages 27. A flow through one of these passages will be prevented because the valve 28 controlling the latter will be in closed position. However, the corresponding valve of the opposite assembly will be open. The fluid will accordingly flow past the seat of this latter valve, through the bore of member 32 and past the surfaces of pin 35 which is maintaining valve 28 out of seated position. The fluid will continue to flow through bore 33 and so through passage 24 to the enlarged portion 25 of the cylinder. It will act against the face of the adjacent piston to force it to its extreme point of travel. In such movement, the piston will be caused to operate pinion 22 or any other unit connected to it. Simultaneously, it will force the opposite piston 19 to fully retracted position within its cylinder. Fluid within such latter cylinder will be exhausted by flowing through passage 27, channel 34 and through the bore of member 32 past the pin 35 and valve 29.

As a consequence of the relatively restricted opening 39 through which the fluid must escape into the sump, a certain amount of back pressure will occur. This pressure will be proportional to the speed of operation of the parts and a safety provision will be provided, preventing the latter operating at too great a speed. Moreover, a cushioning effect will occur and the fluid flowing into the sump will build up in depth and will lubricate all parts of the mechanism. It will finally rise to a level such, that it may escape through tube 12.

As afore traversed the reciprocation of the pistons assembly will result in an oscillation of the arms 42. This will in turn result in the toggle mechanism shifting, with consequent shifting of the cam 44 to cause a functioning of the valve assemblies to maintain proper reciprocation of the pistons. Excepting only when the arms are at points adjacent their limits of travel, the cam 44 will be locked against movement and thus difficulties will not occur. The valve action may be extremely rapid and well timed because the cams associated with the hub portions 54 will serve to relieve the contact between the tappet and the cam 44 as the latter is potentialized to shift.

As also afore brought out and as a consequence of the structure provided by the stop shoulder 40, no damage will occur to the springs 38. Also, regardless of the amount that the operator may open the manually controlled valve associated with line 11, no damage of the parts can occur, because of an over-speeding of the same. More particularly this will be prevented incident to the metering plug 13 as well as the relatively restricted size of the orifice 39.

Thus, among others the several objects of the invention as specifically afore noted are achieved. Obviously numerous changes in construction and rearrangements of the parts might be resorted to without departing from the spirit of the invention as defined by the claims.

We claim:

1. An apparatus of the character described including in combination a cylinder, a piston reciprocable within said cylinder, a valve mechanism for controlling the flow of fluid into and away from said cylinder, a valve operating element, means connecting the latter with said piston whereby said valve operating element will function in response to piston movements as the latter reaches its limit of movement, additional means for locking said element against movement and means forming a part of said last named means and functioning solely upon said piston reaching a position adjacent its limit of movement for rendering said locking means inoperative.

2. A motor mechanism including in combination a pair of opposed cylinders, pistons reciprocable within said cylinders, valve mechanisms for controlling the flow of fluid to and from said cylinders, a cam shiftable to operate said valve mechanism, means for connecting said cam to cause it to be shifted in response to the movement of said pistons and upon the latter reaching their limits of travel, spring means for normally locking said cam against movement and means connected to said piston and operative in response to the movements of the latter for releasing said spring means upon said pistons reaching positions substantially adjacent their limits of movement.

3. An apparatus of the character described including in combination, means providing a pair of opposed cylinders, pistons movable within said cylinder, means for connecting said pistons, valve mechanisms controlling the flow of fluid into and away from said cylinders, tappets forming a part of said mechanisms, a cam cooperating with said tappets for shifting the latter and said valve mechanisms, means for connecting said pistons with said cam whereby to operate the latter and means forming a part of said connecting means and also cooperating with said tappets to move the latter out of bearing contact with said cam.

4. An apparatus of the character described including in combination, means providing a pair of opposed cylinders, pistons movable within said cylinder, means for connecting said pistons, valve mechanisms controlling the flow of fluid into and away from said cylinders, tappets forming a part of said mechanisms, a cam cooperating with said tappets for shifting the latter and said valve mechanisms, means for connecting said pistons with said cam whereby to operate the latter, means cooperative with said cam for locking the latter against movement and means forming a part of said connecting means for rendering said locking means inoperative and for also moving said tappet out of bearing contact with said cam.

5. A motor including in combination means providing a cylinder, a piston reciprocable within said cylinder, a valve mechanism for controlling the flow of fluid to and away from said cylinder, said valve mechanism including a valve body, a spring bearing against the same, a guide for said spring, a tappet mounted on said guide and embodying said spring and means functioning as a stop, to limit inward movement on the part of said tappet with respect to said guide.

6. A motor including in combination means providing a cylinder, a piston reciprocable within said cylinder, a valve mechanism for controlling the flow of fluid to and away from said cylinder, said valve mechanism including a body formed with an opening through which the fluid discharged from said cylinder is adapted to flow, and the size of said opening being relatively restricted, whereby only a limited amount of fluid may pass therethrough and whereby back pressure will be built up between said orifice and said cylinder, such that the speed of movement of the piston will be limited.

7. A motor including a body formed with cylinders, pistons reciprocable within said cylinders, a shaft connected to said pistons and to be operated thereby, said body being formed with passages extending to said cylinders to permit the flow of fluid therefrom as well as into the same, valve mechanisms interposed in said passages and in advance of said cylinders, said mechanisms including a pair of inwardly extending springs, valves engaged by said springs and to be moved thereby into seated positions, further valves arranged beyond said first-named valves and actuating elements extending between said first-named valves and further valves to move the latter into unseated positions as the former move into seated positions, a cam rockingly mounted between said springs and to act against the same to cause said first-named valves to be shifted, means connecting said cam with said pistons to cause the former to move in response to movements of the latter and means forming a part of said last-named means and serving to compress one of said springs prior to said cam being moved to spring-compressing position.

8. A motor including a body formed with cylinders, pistons reciprocable within said cylinders, a shaft connected to said pistons and to be operated thereby, said body being formed with passages extending to said cylinders to permit the flow of fluid therefrom as well as into the same, valve mechanisms interposed in said passages and in advance of said cylinders, said mechanisms including a pair of inwardly extending springs, valves engaged by said springs and to be moved thereby into seated positions, further valves arranged beyond said first-named valves and actuating elements extending between said first-named valves and further valves to move the latter into unseated positions as the former move into seated positions, a cam rockingly mounted between said springs and to act against the same to cause said first-named valves to be shifted, means connecting said cam with said pistons to cause the former to move in response to movements of the latter, means forming a part of said last-named means and serving to compress one of said springs prior to said cam being moved to spring-compressing position and means also controlled by said last-named means and serving normally to lock said cam against movement until the spring to be acted upon by said cam has been substantially compressed.

9. A motor including a cylinder, a piston reciprocable to limits of travel within the same, a driving member connected to and to be operated in response to the reciprocation of the piston, valve mechanism governing the admission to and escape of fluid from the cylinder, means providing a "snap action" assembly connected to be operated by said piston and functioning upon the latter reaching positions adjacent its limits of travel to cause sudden action of said valve mechanism, means independent of said valve mechanism actuating means and acting to prevent movement of said valve mechanism until said piston has reached a position adjacent one of its limits of travel, and means connecting said last named means to cause it to be operated responsive to the movements of the piston.

ELIAS ORSHANSKY, Jr.
ERNEST W. FULLER.